United States Patent
O'Neill et al.

(10) Patent No.: US 9,571,151 B2
(45) Date of Patent: Feb. 14, 2017

(54) CASES FOR MOBILE ELECTRONIC DEVICES CONFIGURED TO RECEIVE AUXILIARY OPTICAL DEVICES

(71) Applicant: olloclip, LLC, Huntington Beach, CA (US)

(72) Inventors: Patrick D. O'Neill, Huntington Beach, CA (US); Chong Pak, Lakewood, CA (US); Joshua Cantor, Huntington Beach, CA (US); Bobby Kong, Walnut Park, CA (US)

(73) Assignee: olloclip, LLC, Huntington Beach, CA (US)

( * ) Notice: Subject to any disclaimer, the term of this patent is extended or adjusted under 35 U.S.C. 154(b) by 0 days.

(21) Appl. No.: 14/606,500

(22) Filed: Jan. 27, 2015

(65) Prior Publication Data
US 2015/0222315 A1 Aug. 6, 2015

Related U.S. Application Data

(60) Provisional application No. 61/936,824, filed on Feb. 6, 2014.

(51) Int. Cl.
| | |
|---|---|
| *H04M 1/00* | (2006.01) |
| *H04B 1/3888* | (2015.01) |
| *H04M 1/02* | (2006.01) |
| *H04M 1/18* | (2006.01) |

(52) U.S. Cl.
CPC ......... *H04B 1/3888* (2013.01); *H04M 1/0264* (2013.01); *H04M 1/185* (2013.01)

(58) Field of Classification Search
CPC .. H04B 1/3888; H04M 1/0264; G03B 17/565; H05K 5/0217

USPC ................ 455/556.1, 575.1, 575.6
See application file for complete search history.

(56) References Cited

U.S. PATENT DOCUMENTS

| | | | |
|---|---|---|---|
| 3,140,905 A | 7/1964 | Trotter et al. | |
| 3,575,485 A | 4/1971 | MacMaster | |
| 4,972,306 A | 11/1990 | Bornhorst | |
| 5,070,407 A | 12/1991 | Wheeler et al. | |

(Continued)

FOREIGN PATENT DOCUMENTS

| | | |
|---|---|---|
| CN | 2694645 | 4/2005 |
| WO | WO 2013/103845 | 7/2013 |

OTHER PUBLICATIONS

"Gizmon Smart Clip," Aug. 25, 2013 (printed Jan. 27, 2016), http://gizmon.com/gizmon-smartclip/.
U.S. Appl. No. 29/441,469, filed Jan. 4, 2013, O'Neill et al.

*Primary Examiner* — Md Talukder
(74) *Attorney, Agent, or Firm* — Knobbe, Martens, Olson & Bear, LLP

(57) ABSTRACT

Examples of cases and other accessories for mobile electronic devices are provided. Some cases are provided to protect mobile electronic devices from unintended forceful contact that could otherwise cause damage to the mobile electronic devices and/or to protect the mobile electronic devices against unwanted and potentially damaging ingress of harmful materials, such as water, dust, dirt, and/other potentially damaging materials. Some cases can include an attachment region that is configured to receive an auxiliary component to be used and/or attached with the mobile electronic device, such as an auxiliary lens or other optical device that can be used and/or attached with an onboard camera of the mobile electronic device.

22 Claims, 10 Drawing Sheets

(56) References Cited

U.S. PATENT DOCUMENTS

| | | | |
|---|---|---|---|
| 5,541,686 A | 7/1996 | Stephenson | |
| 6,356,441 B1 | 3/2002 | Claprood | |
| D565,290 S | 4/2008 | Brandenburg et al. | |
| 7,847,860 B2 | 12/2010 | Kim | |
| 8,023,263 B2 | 9/2011 | Crippen | |
| 8,073,324 B2 | 12/2011 | Tsai | |
| D663,263 S | 7/2012 | Gupta et al. | |
| 8,226,306 B2 | 7/2012 | Chou | |
| 8,279,544 B1 | 10/2012 | O'Neill | |
| D676,432 S | 2/2013 | Hasbrook et al. | |
| D677,250 S | 3/2013 | Takamoto | |
| D679,695 S | 4/2013 | Fahrendorff et al. | |
| D684,567 S | 6/2013 | Murchison et al. | |
| D706,271 S | 6/2014 | Gelsomini et al. | |
| D709,439 S | 7/2014 | Ferber et al. | |
| D709,485 S | 7/2014 | Bishop | |
| D714,275 S | 9/2014 | Tompkin | |
| 8,891,187 B2* | 11/2014 | O'Neill | G02B 7/14 359/819 |
| D740,268 S | 10/2015 | O'Neill et al. | |
| 9,195,023 B2 | 11/2015 | O'Neill et al. | |
| 2002/0160724 A1 | 10/2002 | Arai et al. | |
| 2003/0122957 A1 | 7/2003 | Emme | |
| 2005/0245295 A1 | 11/2005 | Lee et al. | |
| 2007/0216796 A1 | 9/2007 | Lenel et al. | |
| 2007/0280677 A1 | 12/2007 | Drake et al. | |
| 2008/0273112 A1 | 11/2008 | Sladen | |
| 2009/0109325 A1 | 4/2009 | Imai et al. | |
| 2009/0109558 A1 | 4/2009 | Schaefer | |
| 2009/0181729 A1 | 7/2009 | Griffin, Jr. et al. | |
| 2009/0203398 A1 | 8/2009 | Griffin | |
| 2009/0237812 A1 | 9/2009 | Tseng et al. | |
| 2010/0200456 A1 | 8/2010 | Parkinson | |
| 2010/0328420 A1* | 12/2010 | Roman | H04N 5/2251 348/14.08 |
| 2011/0009174 A1 | 1/2011 | Ladouceur et al. | |
| 2011/0073505 A1 | 3/2011 | Stiehl | |
| 2011/0097070 A1 | 4/2011 | Kurokawa et al. | |
| 2011/0286199 A1 | 11/2011 | Miikkola et al. | |
| 2011/0309728 A1 | 12/2011 | Diebel | |
| 2012/0236424 A1* | 9/2012 | Yang | G02B 7/022 359/819 |
| 2012/0236425 A1* | 9/2012 | O'Neill | G02B 7/14 359/827 |
| 2012/0245422 A1* | 9/2012 | Hasbun | A61B 1/00108 600/200 |
| 2012/0257008 A1* | 10/2012 | Taylor | H04N 5/2252 348/36 |
| 2012/0321294 A1 | 12/2012 | Tages et al. | |
| 2013/0002939 A1* | 1/2013 | O'Neill | G02B 7/14 348/360 |
| 2013/0028591 A1 | 1/2013 | Hicks | |
| 2013/0063004 A1 | 3/2013 | Lai et al. | |
| 2013/0069499 A1 | 3/2013 | Modrell | |
| 2013/0121677 A1 | 5/2013 | Yeh et al. | |
| 2013/0127309 A1* | 5/2013 | Wyner | H05K 5/0217 312/223.1 |
| 2013/0135871 A1 | 5/2013 | Harooni | |
| 2013/0177304 A1* | 7/2013 | Chapman | G03B 17/565 396/533 |
| 2013/0206614 A1* | 8/2013 | O'Neill | H04B 1/3888 206/216 |
| 2013/0240578 A1 | 9/2013 | Yu | |
| 2013/0329115 A1 | 12/2013 | Palmeri | |
| 2013/0335315 A1 | 12/2013 | Bonnat | |
| 2014/0071547 A1* | 3/2014 | O'Neill | G02B 7/02 359/827 |
| 2014/0132781 A1* | 5/2014 | Adams | H04N 5/2254 348/207.1 |
| 2014/0171150 A1* | 6/2014 | Hurst | H04M 1/0264 455/556.1 |
| 2014/0226268 A1* | 8/2014 | O'Neill | G03B 15/06 361/679.01 |
| 2014/0226300 A1 | 8/2014 | O'Neill et al. | |
| 2014/0227026 A1* | 8/2014 | O'Neill | G03B 15/06 403/322.4 |
| 2014/0263939 A1* | 9/2014 | Rinner | F16M 11/10 248/688 |
| 2014/0267882 A1* | 9/2014 | O'Neill | H04N 5/2254 348/360 |
| 2014/0268376 A1* | 9/2014 | O'Neill | G03B 17/565 359/827 |
| 2014/0268516 A1* | 9/2014 | Fathollahi | A45C 11/00 361/679.01 |
| 2014/0300809 A1* | 10/2014 | Oliveira | H04N 5/232 348/376 |
| 2014/0360893 A1* | 12/2014 | Whitten | A45C 11/00 206/45.2 |
| 2015/0002950 A1* | 1/2015 | O'Neill | G02B 7/14 359/827 |
| 2015/0156898 A1* | 6/2015 | Shin | H04M 1/0256 361/679.02 |
| 2015/0172522 A1* | 6/2015 | O'Neill | H04N 5/2252 348/240.3 |
| 2015/0177147 A1* | 6/2015 | Mangan | G01N 33/04 250/432 R |
| 2015/0180527 A1* | 6/2015 | Fathollahi | H04B 1/3888 455/575.8 |
| 2015/0222315 A1* | 8/2015 | O'Neill | H04B 1/3888 455/575.8 |
| 2015/0293430 A1* | 10/2015 | O'Neill | G03B 17/565 396/544 |
| 2015/0370150 A1* | 12/2015 | O'Neill | G03B 17/565 348/360 |

* cited by examiner

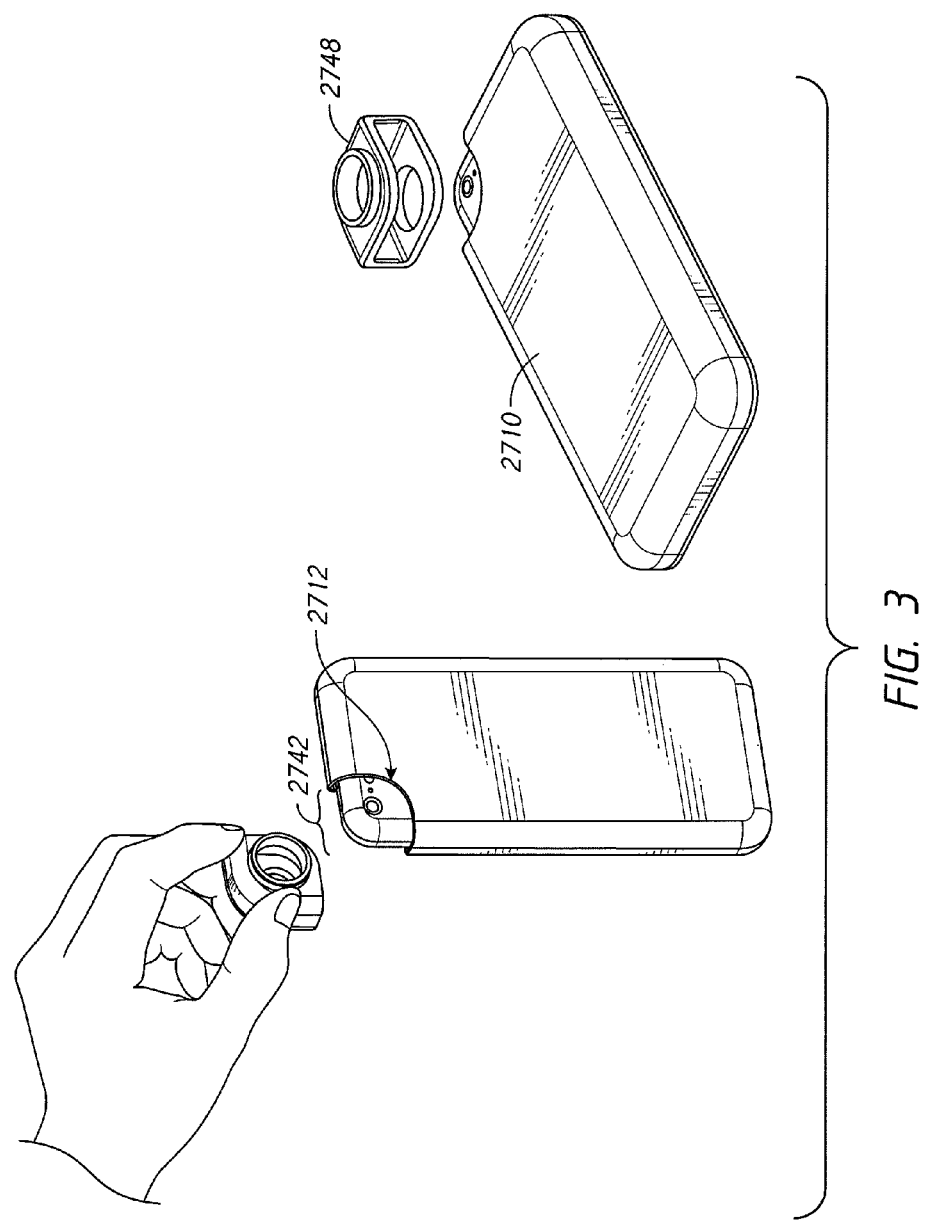

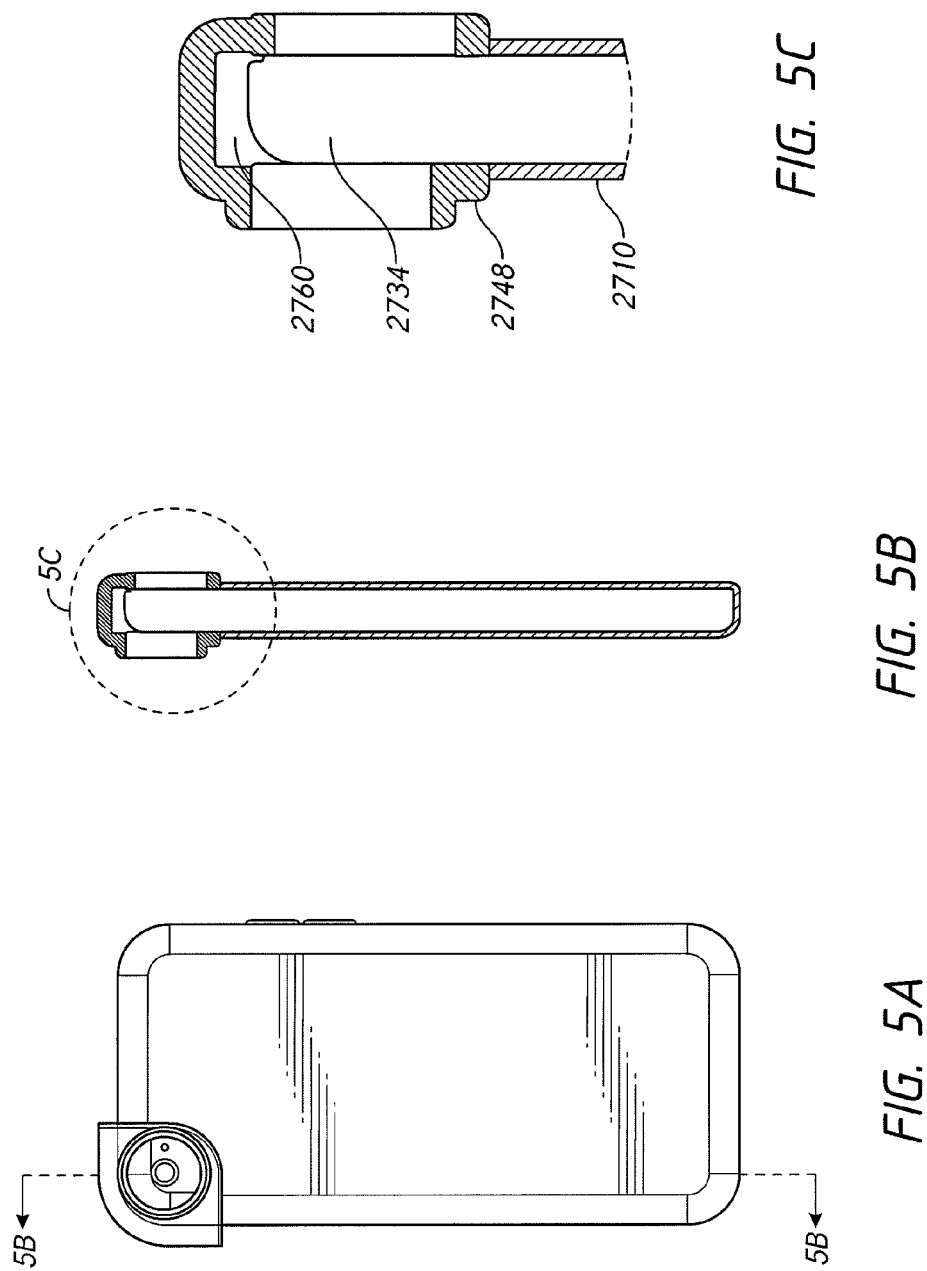

CASES FOR MOBILE ELECTRONIC DEVICES CONFIGURED TO RECEIVE AUXILIARY OPTICAL DEVICES

RELATED APPLICATIONS

This application claims the benefit of U.S. Provisional Patent Application No. 61/936,824 filed on Feb. 6, 2014 and entitled "ACCESSORIES FOR MOBILE DEVICES," the entire contents of which is hereby incorporated by reference herein and made part of this specification for all that it discloses.

BACKGROUND

Field

This invention relates generally to cases and other accessories, and specifically to cases and other accessories for mobile electronic devices (e.g., mobile telephones, mobile texting devices, electronic pad devices, laptop computers, desktop computers, gaming devices, and/or devices capable of linking electronically to another device or to a network such as the Internet, etc.)

Description of the Related Art

In recent years, many advances in computer networking and processing technology have made it possible for mobile devices to include cameras that permit users to capture images. In many cases, these images can be stored, processed, and transmitted. However, there are many design constraints on onboard cameras in mobile devices that can limit the weight, size, expense, shape, adjustability, and overall quality of the lensing systems of such cameras. Consequently, many cameras in communications devices are inadequate for a wide variety of photographic needs and may produce poor quality photographic images.

The deficiencies of onboard camera lenses can be addressed by modular or detachable lensing systems. Such lensing systems may be mounted or attached to mobile devices such that one or more auxiliary lenses are positioned substantially over the onboard camera lenses of the mobile devices. The auxiliary lenses can enhance or alter the light that may be captured by the onboard cameras to generate an image.

Other accessories may be used with mobile devices, such as protective cases. A case is intended to provide protection for the mobile device, and inhibit wear and/or damage to the mobile device. Conventionally, protective cases cover the exterior of the mobile device, or some portion thereof, to cushion impacts, protect against scratches, etc.

SUMMARY OF THE DISCLOSURE

Examples of cases and other accessories for mobile electronic devices are provided. In some embodiments, cases are provided to protect mobile electronic devices from unintended forceful contact that could otherwise cause damage to the mobile electronic devices and/or to protect the mobile electronic devices against unwanted and potentially damaging ingress of harmful materials, such as water, dust, dirt, and/other potentially damaging materials. In some embodiments, cases can include an attachment region that is configured to receive an auxiliary component to be used and/or attached with the mobile electronic device, such as an auxiliary lens or other optical device that can be used and/or attached with an onboard camera of the mobile electronic device.

BRIEF DESCRIPTION OF THE DRAWINGS

Embodiments of various inventive features will now be described with reference to the following drawings. Certain comments and descriptions are provided in the drawings as examples, but the comments and descriptions should not be understood to limit the scope of the inventions or to provide the only possible applications, structures, or usage for the illustrated examples. Throughout the drawings, reference numbers may be re-used to indicate correspondence between referenced elements. The drawings are provided to illustrate example embodiments described herein and are not intended to limit the scope of the disclosure.

FIG. 3 illustrates the case of FIG. 2 on a mobile electronic device with an auxiliary lensing component in the process of being attached to the mobile electronic device.

FIG. 5A-5C illustrate a rear plan view and a side view of the case and mobile electronic device of FIG. 2 with an auxiliary lensing component attached to the mobile electronic device.

DETAILED DESCRIPTION OF EMBODIMENTS

Figure 1A:
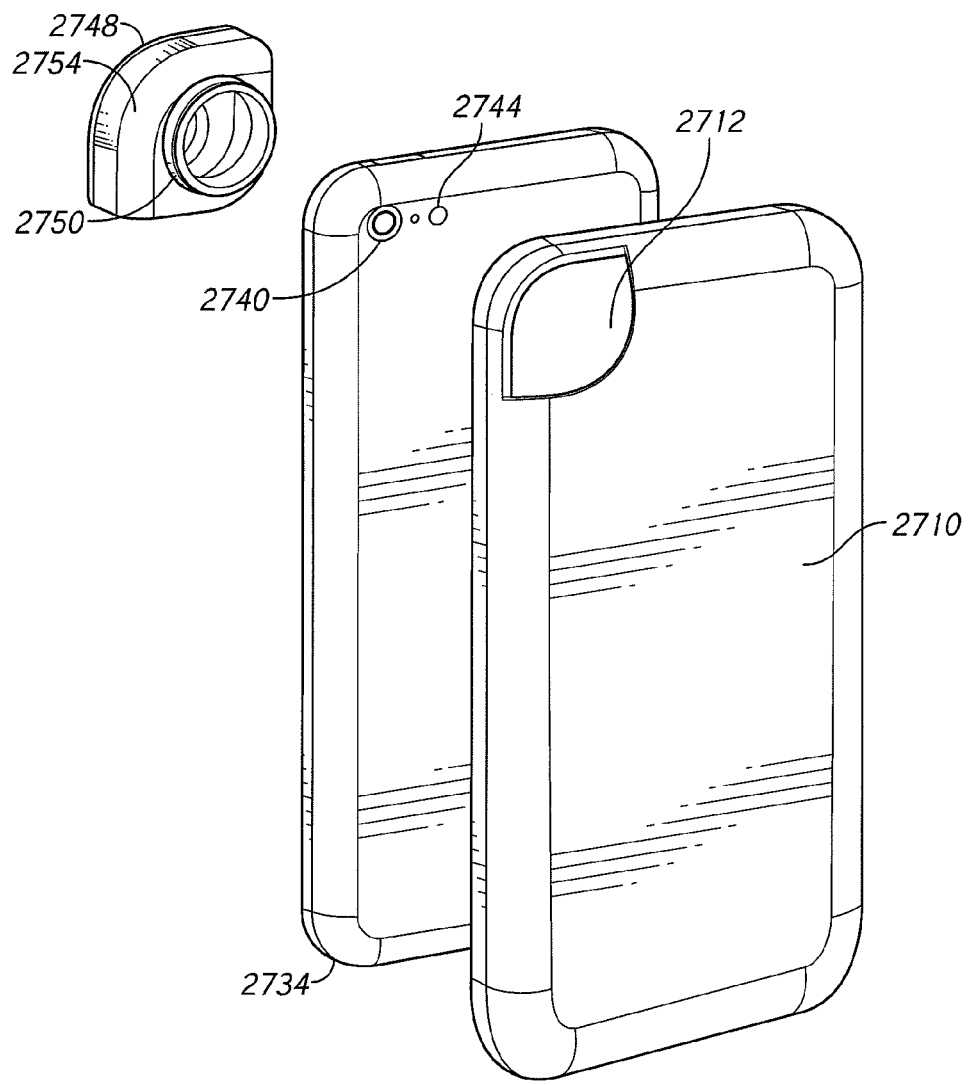
FIG. 1A illustrates an auxiliary lensing component, a mobile electronic device, and a case for a mobile electronic device attached to a mobile electronic device, the case having an opening configured to receive the auxiliary lensing component or other auxiliary component for use with a mobile electronic device.

The present disclosure relates generally to protective cases and other accessories for mobile devices. Many different structures, features, steps, and processes are shown and/or described in discrete embodiments for convenience, but any structure, feature, step, or process disclosed herein in one embodiment can be used separately or combined with or used instead of any other structure, feature, step, or disclosed in any other embodiment. Also, no structure, feature, step, or processes disclosed herein is essential or indispensable; any may be omitted in some embodiments.

The terms "mobile electronic devices" and "mobile devices" in this specification are used in their ordinary sense, and include mobile telephones, mobile texting devices, media players, electronic tablet devices, laptop computers, desktop computers, gaming devices, wearable electronic devices (e.g., "smart watches" or "smart eyewear"), and/or mobile electronic communication devices capable of linking electronically to another device or to a network such as the Internet, etc. Some mobile electronic devices include one or more onboard cameras that can be used for various imaging purposes, such as photography and video recording. For example, imaging accessories can be used with a mobile device to stabilize the mobile device, adjust focus, provide light, change angle, and the like. Imaging devices can include a retainer for connecting an imaging device to a mobile electronic device, a lens, a light-modifying device and/or a positioning device (e.g., a lens hood, a camera stand, etc.), a light source, a lens cover, a lens filter, etc.

The term "lens" in this specification is used in its ordinary sense, and includes powered lenses (e.g., lenses that focus, magnify, enlarge, or otherwise alter the direction of light passing through the lens), plano lenses (e.g., lenses that are generally planar, lenses that do not taper in thickness, and/or lenses that are not powered), simple lenses, compound lenses, generally spherical lenses, generally toroidal lenses, generally cylindrical lenses, etc. Any imaging device described or illustrated in this specification can include a retainer attached to one or more lenses or optical regions with one or more different features, including but not limited to a constant or variable magnifying lens, a wide-angle lens, a fish-eye lens, a telescopic lens, a macro lens, a constant or variable polarizing lens, an anti-reflection lens, a contrast-enhancing lens, a light-attenuating lens, a colored lens, or any combination of the foregoing, etc. An imaging device can comprise a retainer with a plurality of attachment regions for removably or permanently attaching multiple lenses to the same retainer. For example, in some embodiments, a first lens is attached to a first side of the retainer and a second lens is attached to a second side of the retainer.

Protective cases can include a body portion that covers the exterior of mobile devices or some portion thereof to cushion impacts, protect against scratches, and the like. Protective cases can include access regions, including exposed regions, moveable access regions, external actuators, cutaways, or openings for accessing features and components of the mobile device on which the cases are installed, such as one or more onboard cameras, screens, buttons, electrical connectors, lenses, optical elements, etc. However, it can be difficult to attach an accessory or some other auxiliary structure to a mobile device when the mobile device is generally surrounded by the protective case. For example, the protective case may not permit direct access to the mobile device, or the auxiliary structure may be specially sized for attachment to a mobile device with a housing of a particular shape and size. As a result, the auxiliary structure may not fit appropriately on the mobile device when the mobile device is covered by the protective case. In addition, some protective cases may not provide all of the features desired by a user. Some examples of removable accessories for mobile electronic devices (including the Olloclip® lens accessory) that can be used with the embodiments disclosed herein are illustrated and described in U.S. Pat. No. 8,279,544, which is titled "Selectively Attachable and Removable Lenses for Mobile devices" and which issued on Oct. 2, 2012, the contents of which are hereby incorporated by reference in their entirety.

Some aspects of this disclosure relate to protective cases and modular accessories for use with a mobile device. The protective cases can expose one or more areas or components of a mobile device such that an accessory may be used with the mobile device. For example, an auxiliary lensing component may be used with a mobile device when an onboard camera lens, or some portion of the device that includes the camera, is exposed by the protective case. The terms "lensing component" or "lens" or any derivatives thereof and related terms are used in accordance with their customary meanings and includes any optical structure that alters or modifies one or more characteristics of light (including but not limited to magnification, attenuation, darkening, polarization, filtering, reflection, glare, color, image field, image shape, etc.) In some embodiments, an accessory may be added or attached to or used with a mobile device, and the protective case can protect both the mobile device and the accessory while the accessory is in use. For example, a lensing component may be attached to a mobile device, and the device with the lensing component added may be inserted into a protective case. In some embodiments, separate components may be used to protect the accessory and the mobile device (e.g., a protective enclosure for the mobile device and a separate protective component for the accessory).

Additional aspects of the disclosure relate to modular accessories that may be used with a protective case and a mobile device. In some embodiments, a case can include at least first and second separable parts. For example, a basic, low-weight, low-profile, foundational, or "sleek" first case part may provide basic protection for a mobile device, generally closely conforming to the exterior shape of the mobile device, while providing a low profile and a low amount of extra bulk and weight to the device. Such a case may be desirable for regular use due to the small amount of bulk and weight that it adds to the device. However, a user may also desire some additional features, such as those provided by larger or heavier cases and accessories, on an as-needed basis. To provide additional features and components to basic, low-profile, foundational, minimal, or "sleek" cases, modular accessories may be added to the cases by way of one or more additional parts, as desired. For example, battery packs, tripod mounts, and the like may be added. In some embodiments, the modular accessories may be added to the mobile device instead of or in addition to a protective case.

FIGS. 1-5 show a mobile device 2734, a protective case 2710, and an auxiliary lens component 2750. The protective case 2710 may include a case body with an opening 2712 that is sized and positioned such that one or more components of a mobile device 2734 (e.g., an onboard camera lens 2740 and/or a flash component 2744) may be used when the protective case 2710 is installed on the mobile device 2734. As shown, the case body can have a smooth, curvilinear shape, without a protruding edge or a protruding border. The opening 2712 can have any suitable shape in a particular application. For example, as illustrated, the opening 2712 can comprise one or more curved upper and/or lower sides, which in some embodiments can meet in one or more pointed regions. As shown, the opening 2712 can comprise a tear-drop shape. In some embodiments, as illustrated, the opening 2712 is not a circle. In some embodiments, as illustrated, an upper edge of the opening 2712 generally follows or generally corresponds to the shape of the outer perimeter of a corner region of the case, with a vertical straight portion, a corner portion (which can be curved, as shown), and/or a horizontal straight portion.

In some embodiments, as illustrated in FIG. 1A, the opening 2712 may be substantially or entirely surrounded by some portion of the case 2710, such as a narrow ridge or arch 2711 of case material extending along an upper portion of a side edge and/or a side portion of a top edge (e.g., forming a corner-protecting region, in some instances). In some embodiments, the narrow ridge or arch 2711 forms an attachment region or a portion thereof. As illustrated, the narrow ridge or arch 2711 can have a thickness (between the front and rear faces of the device) that is approximately the same as or no larger than the thickness of the edge region of the mobile electronic device 2734 to which the case 2710 is configured to attach. As illustrated, the upper and/or side edges of the case can comprise an access portion that is thinner or narrower than that rest of the respective upper and/or side edges of the case. In some embodiments, as shown, the attachment region comprises thinner or narrower portions on or along multiple regions of the case, such as at or along a top portion and/or a side portion, forming a corner access region to facilitate removable attachment of an auxiliary component (e.g., an auxiliary lens) in a corner region of the case and/or mobile electronic device. As illustrated, the external outer perimeter of the attachment region can extend along a portion of the outer perimeter of the case, such as along at least a portion of the outermost upper edge and/or outermost side edge of the case.

Figure 1B:
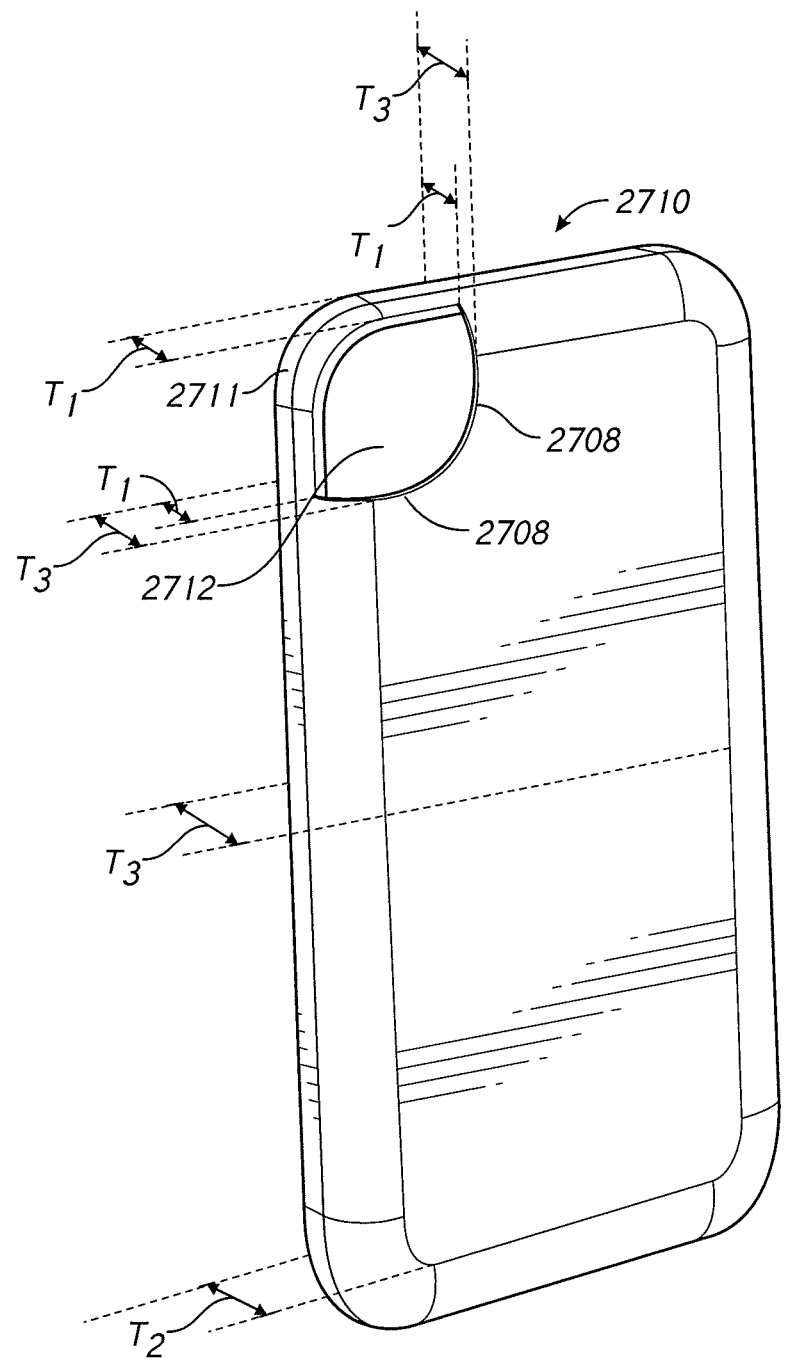
FIG. 1B illustrates a close-up portion of a corner of the case and mobile electronic device shown in FIG. 1A.

As illustrated in FIGS. 1A and 1B, the front-to-back thickness of the case 2710 (e.g., the distance between the front and back surfaces of the case) can be less in the attachment region 2711 near or generally surrounding the opening 2712 (labeled as $T_1$ in FIG. 1B) than in one or more other regions of the case, such as in another corner (e.g., labeled as $T_2$ in FIG. 1B) or along one or more side portions or edges of the case (e.g., labeled as $T_3$ in FIG. 1B) that are spaced from or adjacent to the opening 2712. For example, in some embodiments, as illustrated in FIGS. 1A and 1B, the case at one or more interior side edges 2708 of the opening can have a maximum front-to-back thickness that is greater than the maximum front-to-back thickness of the arch or narrow ridge or attachment region 2711. As illustrated in FIGS. 1A and 1B, the front-to-back thickness along one or more edges, such as a top edge and/or a side edge, of the case 2710 can vary, such as by being narrower along a first portion of the edge (such as in a corner or in a middle region of the edge) than along a second portion of the edge (such as in one or more middle and/or side regions of the edge). For example, as shown in FIGS. 1A and 1B, $T_1$ can be less than $T_2$ and/or less than $T_3$. As shown, at least a portion of one or more of the interior side edges 2708 of the opening can be curved. In some embodiments, by providing a thinner attachment region on the case 2710 in the narrow ridge or arch 2711, as illustrated, the same auxiliary lens component 2748 can be used on a mobile device with or without a case. In some embodiments, as illustrated, the thickness of the case 2710 when attached to the mobile device 2734 in the attachment region 2711 can be sufficiently close to the thickness of the mobile device by itself (e.g., along an edge of the mobile device, as shown) that the retainer portion 2754 can flex or bend, and/or compress slightly more in its interior, if needed, when attaching to a mobile device with a case, while still being configured to maintain a sufficiently tight fit (e.g., a friction fit) when attaching to a mobile device 2734 without a case. The opening 2712 may be configured to facilitate use of additional accessories with the mobile device 2734 when the protective case 2710 is installed, even if such accessories may be designed for use with a mobile device 2734 that has no protective case installed.

For example, an auxiliary lens component 2748 may be used in conjunction with an onboard camera lens 2710 of the mobile device 2734 even though the case 2710 is installed on the mobile device 2734. Any features, structures, steps, or methods of the lens component 2748 may be similar in any respects or the same in any respects as other lens components described herein and/or in U.S. Pat. No. 8,279,544. As shown, the lens component 2748 can include a retainer portion 2754 and a mounting portion 2750. Various optical elements, such as lenses, lens filters, and the like may be mounted to the lens component 2748 via the mounting portion 2750. In one specific, non-limiting embodiment, the lens component 2748 may be an Olloclip® 3-in-1 Photo Lens, 4-in-1 Photo Lens, 3-in-1 Macro Lens, or some other auxiliary lens component manufactured by olloclip, LLC in Huntington Beach, Calif. In some embodiments, as illustrated, the attachment region of the case is the portion of the case that is covered or obscured or bounded by the auxiliary lens component or other auxiliary component when such component is removably attached to the mobile electronic device, or to the case, or to the mobile electronic device and to the case.

In some embodiments, as shown in FIG. 3, the opening 2712 of the case 2710 can permit access to a corner area 2742 of the mobile device so that a lens component 2748 can be attached to the mobile device at the corner area 2742. The lens component 2748 can snap into place and/or be held by a frictional fit without the use of any dynamic mounting structure such as fasteners, clips, etc. on the mobile device 2734. The opening 2712 may be sized to permit attachment of the lens component 2748 (or some other accessory) to the corner area 2742 of the mobile device 2734 without exposing the corner area 2742 to the environment when the lens component 2748 is attached. For example, the opening 2712 may extend laterally less than or equal to about half of the lateral width of the mobile device or case 2710, and extend longitudinally less than or equal to about a quarter of the longitudinal height of the mobile device or case 2710. In some embodiments, the opening 2712 may be about ⅓ the lateral width of the mobile device or case 2710, and/or about ⅕ of the longitudinal height of the mobile device or case 2710. In some embodiments, the size and/or shape of the opening may be complementary to the specific accessory to be attached (such as a specific lens component 2748).

Figure 2:
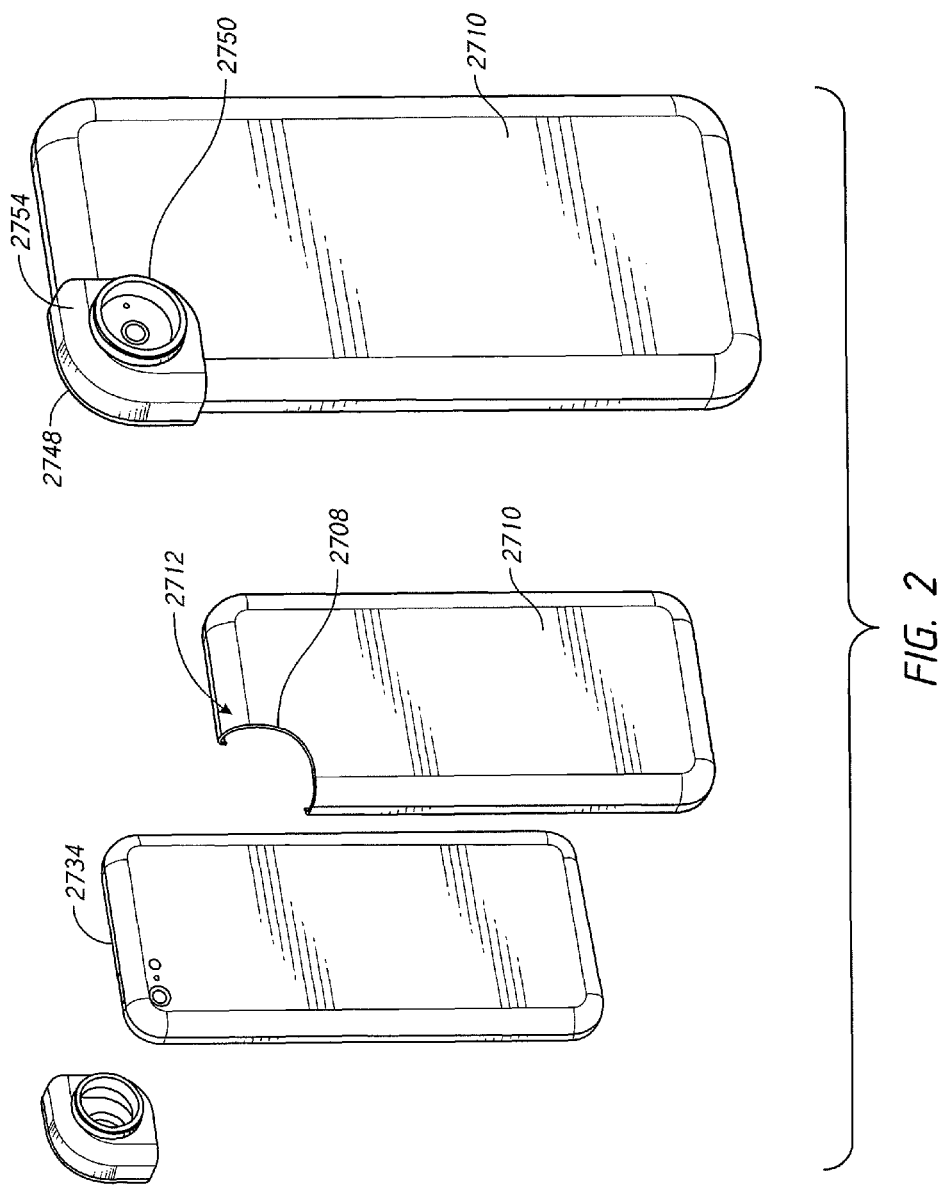
FIG. 2 illustrates another embodiment of a case for a mobile electronic device with an opening, the case being attached to a mobile electronic device.
Figure 4A:
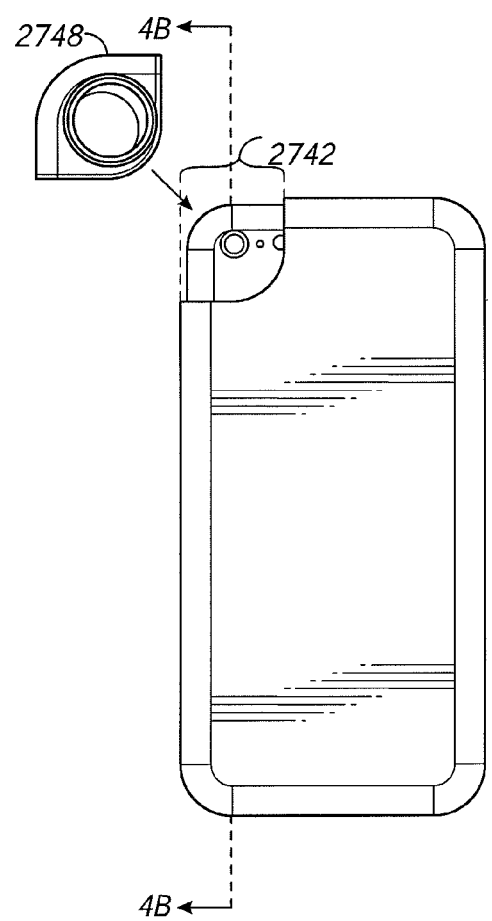
FIG. 4A-4B illustrate a rear plan view and a side view of the case and mobile electronic device of FIG. 2 with an auxiliary lensing component in the process of being attached to the mobile electronic device.
Figure 4B:
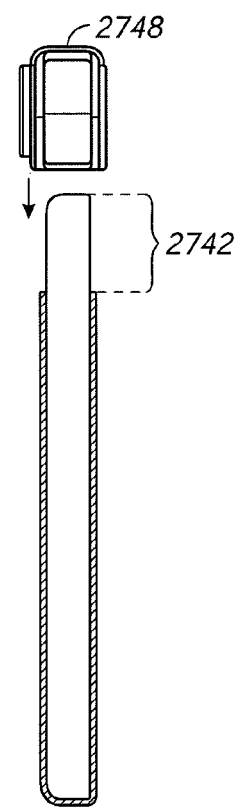

As illustrated in FIGS. 2, 3, 4A, and 4B, an access region of the case can comprise an open region, such as an open corner, without an arch or other protective region of case material surrounding or bordering a portion of the access region. In some embodiments, as shown in FIG. 2, and as with the case illustrated in FIGS. 1A and 1B, the lens component 2748 may contact, fit against, generally match the contour of, or abut against, an edge 2708 or multiple edges of the opening 2712 when installed on the mobile device 2734. This contact with the edge 2708 or edges may help to automatically adjust the position of the lens component 2748 when mounted onto the mobile device. The edge 2708 may be sized, shaped, and/or positioned to inhibit or prevent the lens component 2748 from being inserted further onto the mobile device 2734 than is desirable. For example, the edge 2708 and/or the opening itself may facilitate proper alignment of a lens of the lens component 2748 with the onboard camera lens 2740 of the mobile device 2734. In some embodiments, the attachment between the case and the retainer, or between the case and the mobile electronic device, or among the case, the retainer, and the mobile electronic device, is secure and resists slipping or sliding during normal use. As illustrated, in some embodiments, the attachment region can be configured to receive the auxiliary component in a single slide-on motion using a friction fit, without requiring any dynamic connection (e.g., without requiring a screwing or turning action, or without requiring a clip, a snap, or a slider, etc.) and/or without requiring a magnetic connection. However, any of these of these or other connection means can be used in suitable embodiments.

In some embodiments, the edge 2708 of the opening, as illustrated, can be configured to contact, fit against, generally match the contour of, or abut against, the outer edge of the retainer portion 2754 of an auxiliary lens component, along the entire or substantially the entire length of the edge 2708, on a front and/or rear face of the case 2710. As shown in the figures, the retainer portion 2754 may abut against the edge 2708 when the retainer portion 2754 is attached to a mobile electronic device 2734 in the case 2710 because the thickness of the mobile electronic device 2734 and case 2710 (from the front face of the mobile electronic device 2734 to the back face of the case 2710) at the edge 2708 is greater than the thickness of the mobile electronic device 2734 and case 2710 at the attachment region 2711. In some embodiments, there is essentially no gap, or there are no substantial gaps, between the outer edge of the retainer portion 2754 and the edge 2708 of the opening 2712, along the entire or substantially the entire length of the edge 2708, on a front and/or rear face of the case 2710. In some embodiments, the opening 2712 may be positioned in different areas of the case 2710, such as close to or generally aligned with a midpoint of the upper edge of the case 2710, thus allowing for differently-shaped lens component 2748 and/or different onboard camera lens 2740 locations.

In some embodiments, because the case 2710 can ensure proper alignment of the lens component 2748 with the onboard camera lens of the mobile device 2734, the lens component 2748 does not need to be specially designed for use with the specific mobile device 2734. Instead, the lens component 2748 can be a more general lens component 2748 configured for use with a range of mobile devices, and the case 2710 for a particular mobile device 2734 can facilitate proper installation and alignment. For example, as shown in FIGS. 5A-5C, the case 2710 may prevent insertion of the mobile device 2734 all the way into the lens component 2748, resulting in a void 2760 within the retainer portion of the lens component 2748. Even though the mobile device 2734 has not been inserted all the way into the lens component 2748, the lens component 2734 may be properly aligned with the onboard camera lens of the mobile device 2734.

FIGS. 6-10 show another embodiment of a protective case 3210 installed on a mobile device 3220. In this illustrated example, the protective case 3210 is a "bumper" style case configured to protect the edges of the mobile device 3210 while leaving the front and/or rear face of the mobile device 3210 partially or completely exposed. However, as with all examples in this specification, any structure, feature, step, or process disclosed herein in one embodiment can be used separately or combined with or used instead of any other structure, feature, step, or disclosed in any other embodiment. For example, the protective case 3210 can be a case with a rear face that extends across a rear portion of the mobile electronic device.

In some embodiments, as shown, the protective case 3210 includes a first portion 3212 and a second portion 3214. The first portion 3212 is configured to be movable with respect to the second portion 3214 in order to facilitate use of an accessory with the mobile device 3220, such as a lens component 3230. For example, the first portion 3212 may be an arm configured to pivot and/or "swing" away from a first position in which it protects or covers or surrounds a portion of the mobile device 3220 (e.g., a corner portion 3222), and toward a second position in which the previously protected or covered or surrounded portion of the mobile device 3220 is exposed. The corner portion 3222 may include a component, such as an onboard camera lens (not shown—on the reverse side of the mobile device 3220). When the first portion 3212 is moved away from the corner portion 3222, an accessory (e.g., a lens component 3230) may be removably attached to the mobile device 3220 at the corner portion 3222 (e.g., for use with the onboard camera lens of the mobile device 3220).

As illustrated, the first portion 3212 can comprise an angled body with an upper portion 3219, a corner portion 3225, and a lower portion 3223. The angled body, or any portion thereof, can be rigid, while still sufficiently flexible to bend as needed to insert a mobile phone within the case 3210. As shown, the upper and lower portions 3219, 3223 can be oriented generally perpendicularly such that each of these portions 3219, 3223 converges at the corner portion 3225. As illustrated in the figures, the corner portion 3225 can comprise a curved region in some embodiments.

A mobile electronic device 3220 can be positioned in or attached to the case 3210. The case 3210 can be configured in a first or standard position. For example, in some embodiments of the first or standard position of the case 3210, the upper portion 3219 of the first portion 3212 is oriented substantially horizontally and the lower portion 3225 of the first portion 3212 is oriented substantially vertically. In the first or standard position, an end of the first portion 3212 is removably attachable to an end of the second portion 3214, and the first and second portions 3212, 3214 are generally aligned along a first vertical edge of the mobile device. The case 3210 in the first or standard position can extend around the perimeter of the mobile device or a portion thereof in a manner that protects the mobile device from damaging contact, such as when the mobile device is dropped or hit against another object. In some embodiments, the case 3210 in the first or standard position can extend all the way around the entire perimeter of the mobile device.

Figure 7:
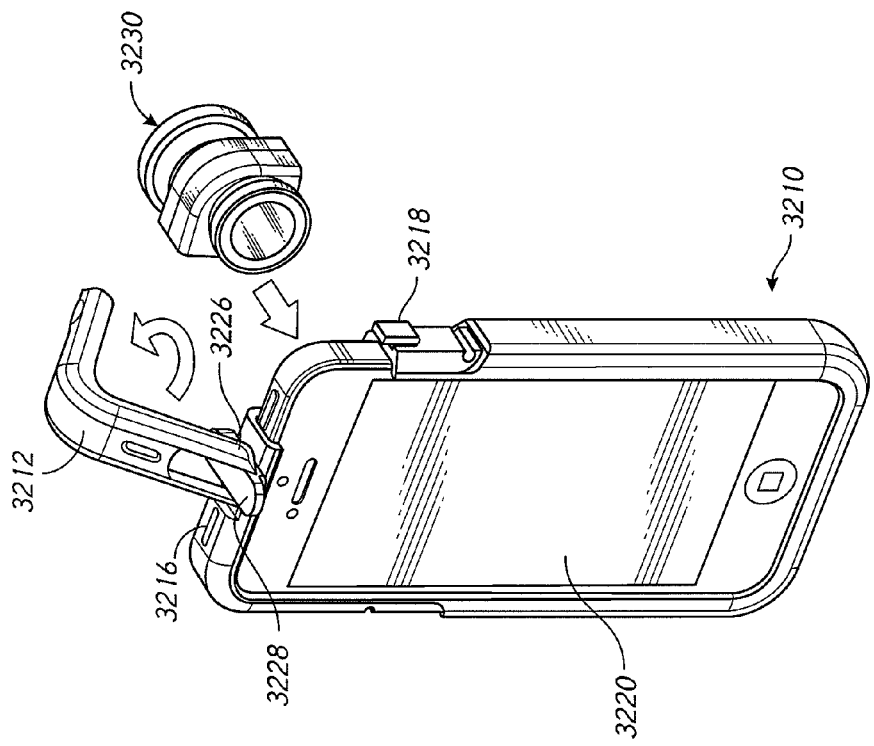
FIGS. 6-9 illustrate front perspective views of another embodiment of a case for a mobile electronic device in respective opening, adjusting, and retaining stages for preparing to receive an auxiliary lensing component or other auxiliary component for use with a mobile electronic device.
Figure 6:
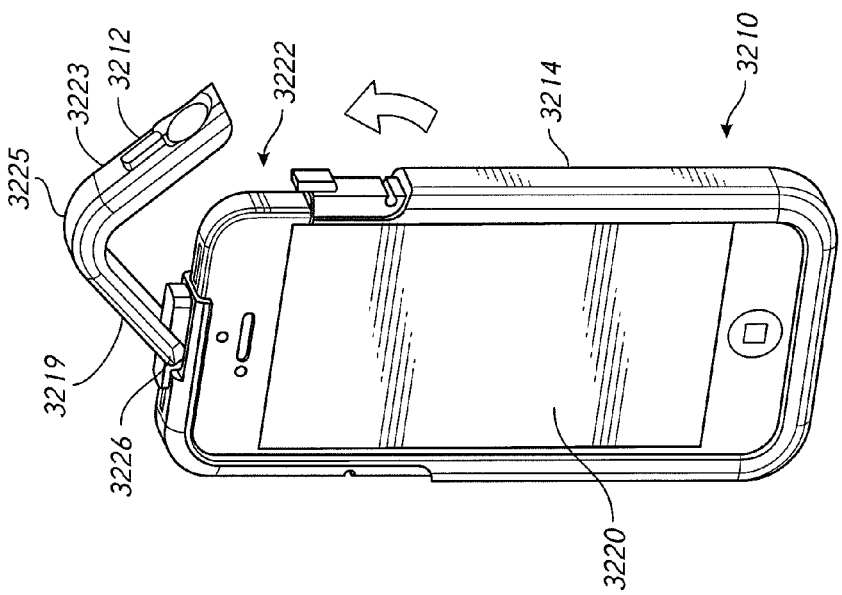

As illustrated in FIGS. 6-7, the case 3210 can be moved from the first or standard position to a second or transitory stage by detaching the first portion 3212 from the second portion 3214, pivoting the first portion 3212 upwardly such that an edge of the first portion moves in generally the same plane as the front face of the mobile device by pivoting the first portion at a first pivot point 3226 on a top edge of the case 3210. In this transitory stage, a region (e.g., a corner region 3222) of the mobile device is exposed outside of or through the case such that one or more auxiliary components 3230 (such as an auxiliary lens) can be brought into functional contact with and/or attached to the case, as illustrated.

From there, the first portion 3212 can be rotated around the top edge of the case at a second rotation point on a top edge of the case 3210 until the first portion 3212 is oriented generally parallel with but generally opposite from its initial orientation in the standard position, as shown. The axes of rotation of the first pivot point 3226 and the second rotation point 3228 can be different from each other. In the illustrated example, the axes of rotation of the first and second rotation points 3226, 3228 are generally perpendicular to each other. In some embodiments, as illustrated, the first pivot point 3226 and the second rotation point 3228 can be located adjacent to each other or in generally the same location or region on the case 3210.

Figure 8:
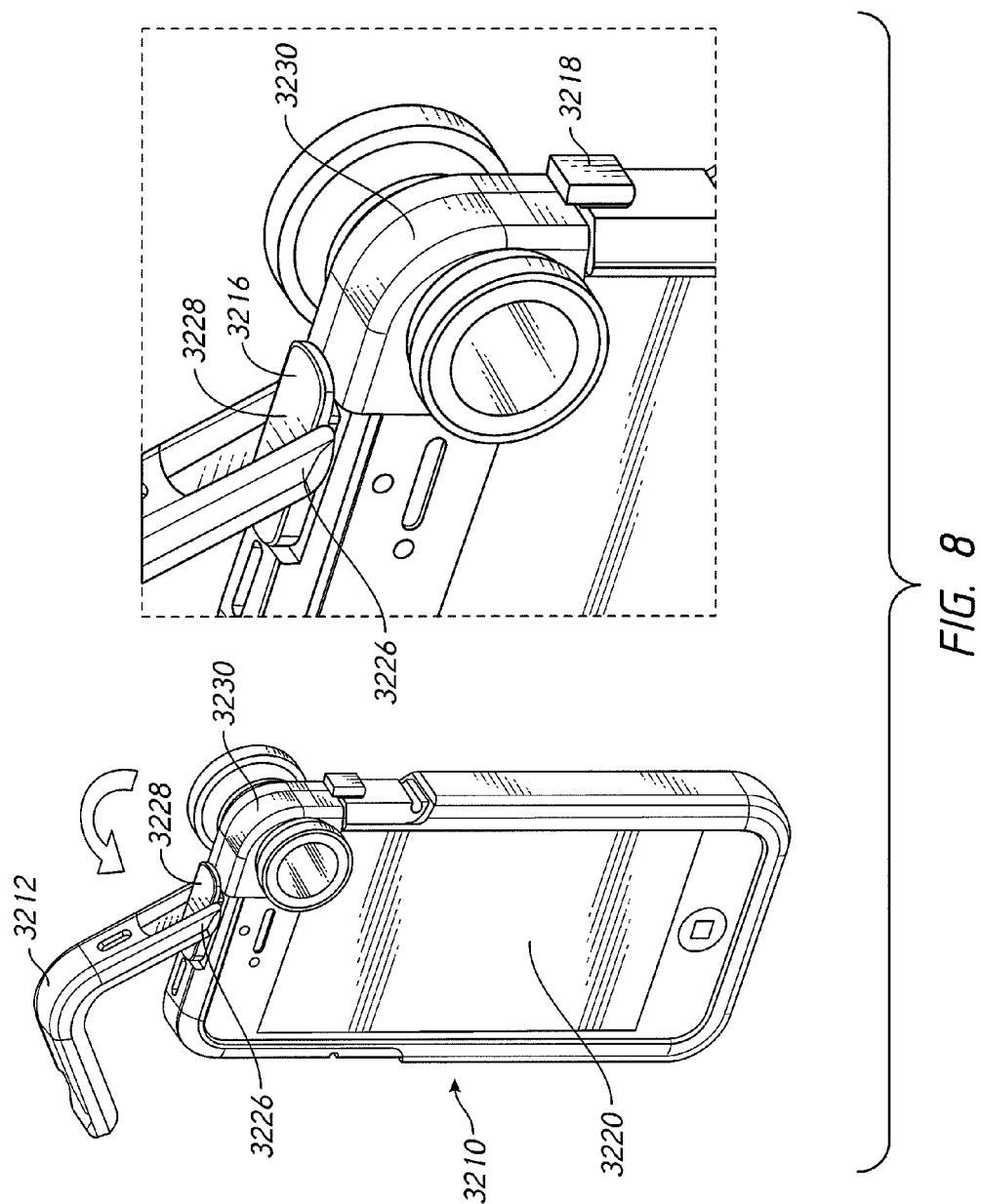
Figure 9:
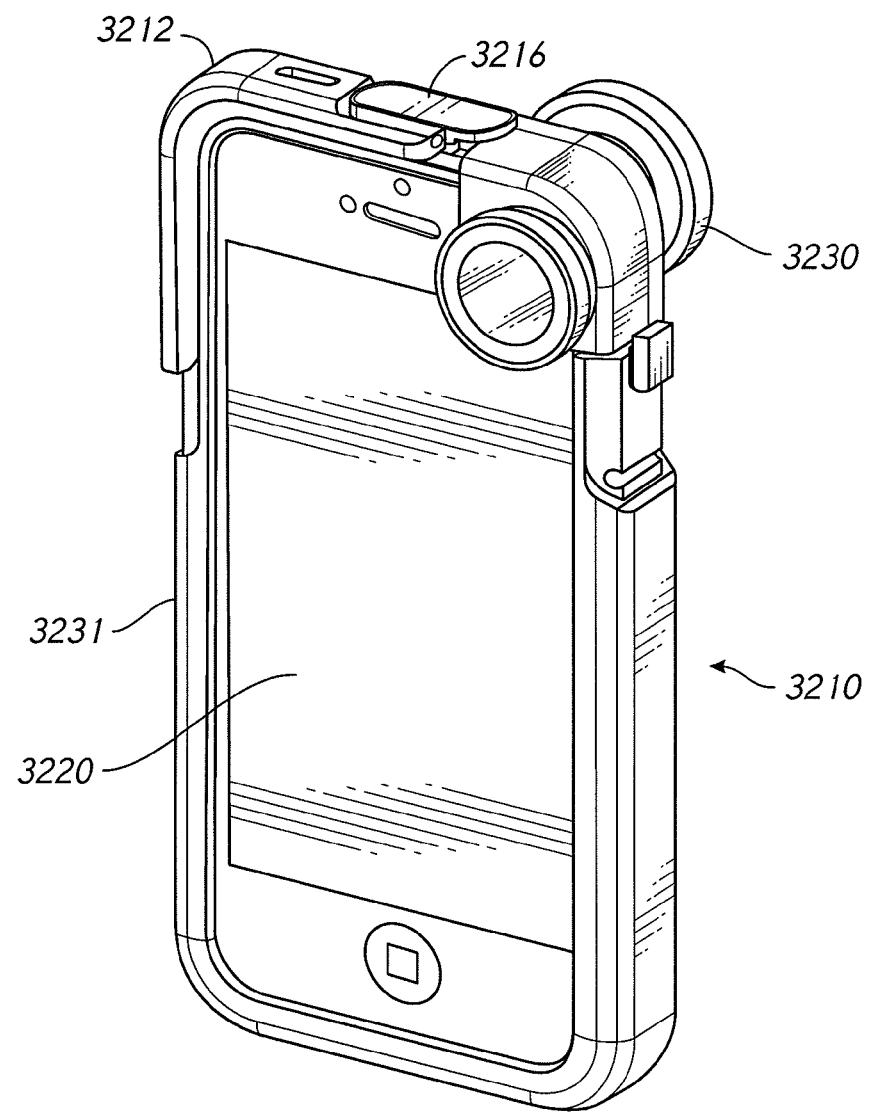

As illustrated in FIGS. 8-9, the first portion 3212 can be moved into a third or component-securing position by pivoting the first portion 3212 back downward until the first portion 3212 is generally aligned along a second vertical edge 3231 of the mobile device that is generally opposite from the first vertical edge of the mobile device, as shown in FIG. 9. In some embodiments, the case 3210 can include a securing system that includes one or more securing components that help to secure the lens component 3230 (or some other auxiliary component) in a desired position. For example, the case 3210 may include multiple (e.g., two or more) locking components, such as locking tabs 3216 and 3218. The locking tabs 3216, 3218 may be secured to the case 3210, and may partially overlap a portion of the lens component 3230 to secure the lens component 3230 in place. In some embodiments, one or more of the locking tabs 3216, 3218 may be movable with respect to the case 3210. For example, a locking tab 3216 may pivot with respect to the second portion 3214 of the case when the first portion 3212 pivots, moving the locking tab 3216 into a retaining position, covering or blocking or locking into a portion of the lens component 3230 to inhibit the removal of the lens component 3230 while the locking tab 3216 is in the retaining position. In this example, a user may pivot the first portion 3212 to expose the corner portion 3222 of the mobile device and attach the lens component 3230. The pivoting of the first portion 3212 may automatically pivot the locking tab 3216 into a position where the locking tab 3216 can partially overlap or otherwise help secure the lens component 3230. The user may move the first portion 3212 into a second position with respect to the second case portion 3214, as seen in FIG. 9. In moving the first portion 3212 into the second position, the locking tab 3216 may be urged toward the lens component 3230 to secure the lens component 3230 to the mobile device. This example is just one type of a securing system. Many different types of securing systems can be used with one or more different types of securing components than are illustrated.

Figure 10:
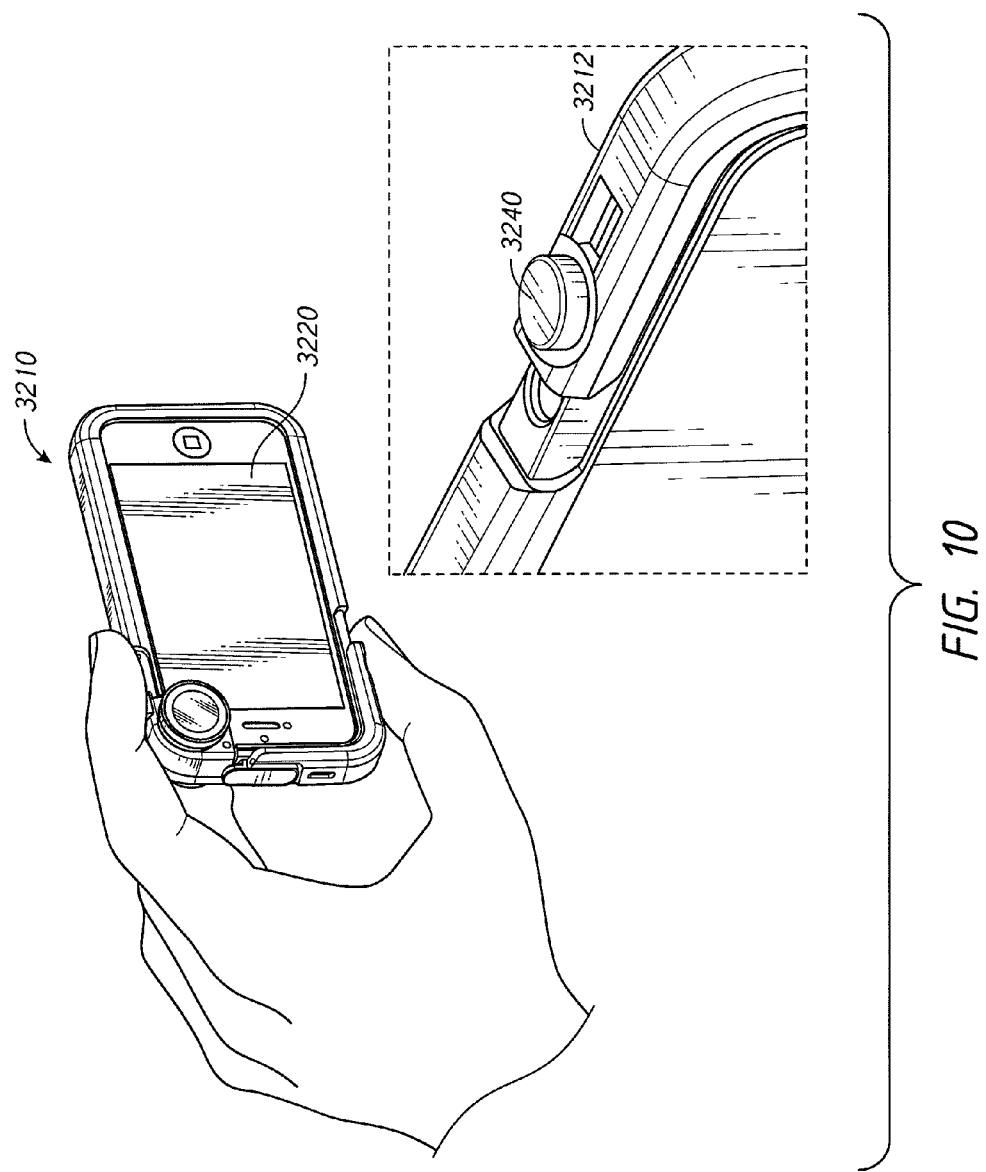
FIG. 10 illustrates a front perspective view of the case and mobile electronic device of FIG. 6 in a horizontal orientation with a close-up view of a portion of the underside of the case and mobile electronic device.

In some embodiments, as illustrated in FIG. 10, the second portion 3212 of the case 3210 may be configured to facilitate activation of an actuator (such as a button or some other component) of the mobile device 3220 when in the second position. For example, the second portion 3212 may include an actuator 3240 that allows a user to activate an underlying button of the mobile device 3200, an aperture that allows access to a button or other actuator of the underlying mobile device 3220, or the like. This feature can allow a user to activate a photo-capturing procedure or other feature of the mobile device when a portion of the case would otherwise block or impede access to the underlying actuator. In some embodiments, as illustrated, the actuator on the case is larger or in some other way more accessible or easier to use than the underlying actuator on the mobile device.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention.

The following is claimed:

1. A protective case for a mobile electronic device with multiple onboard cameras for use with an auxiliary component, the case comprising:
   a case body configured to removably attach to the mobile electronic device, the case body comprising multiple openings or access regions for accessing the multiple onboard cameras of the mobile electronic device, each opening or access region being positioned in a different area of the case to correspond with a different location of a lens of each of the multiple onboard cameras, one of the openings or access regions being positioned within an attachment region, the opening or access region in the attachment region being surrounded by an arch, the attachment region being configured to receive an auxiliary component that is capable of directly forming a friction fit with the mobile electronic device by itself and that is functionally usable with the mobile electronic device when the mobile electronic device is attached to the case body such that one or more of interior side edges of the opening or access region in the attachment region are configured to abut against an edge of the auxiliary component when the auxiliary component is advanced onto the attachment region of the case body, and the case body is configured to permit the auxiliary component to contact both a front surface and a rear surface of the mobile electronic device at the same time;
   a front-to-back thickness along the arch being less than a front-to-back thickness of the case along one or more interior side edges of the opening adjacent to the arch, and the front-to-back thickness of the arch being sufficiently close to a front-to-back thickness of the mobile electronic device to which the case is configured to attach that the case is configured to permit the auxiliary component to also form a friction fit on a combination of the case and mobile electronic device;
   wherein the case is configured to provide protection for the mobile electronic device by resisting damage to the mobile electronic device during attachment and use of the auxiliary component.

2. The combination of the protective case of claim 1 and the mobile electronic device.

3. The combination of the protective case of claim 1 and the auxiliary component.

4. The protective case of claim 1 wherein the case is configured so that when the case receives the auxiliary component and the mobile electronic device, the attachment between the auxiliary component and the mobile electronic device and the case resists sliding during normal use.

5. The protective case of claim 1 wherein one or more of the interior side edges are curved.

6. The protective case of claim 1 wherein the opening of the attachment region is positioned in a corner of the case.

7. The protective case of claim 1 wherein the opening or access region of the attachment region is not a circle.

8. The protective case of claim 7 wherein the opening or access region of the attachment region has an upper edge that generally corresponds to the shape of a corner region of the case.

9. The protective case of claim 8 wherein a lower edge of the opening or access region of the attachment region is curved.

10. The protective case of claim 1 wherein the arch is positioned in a corner region of the case.

11. The protective case of claim 1 wherein the arch is positioned along an upper edge of the case.

12. A protective case for a mobile electronic device for use with an auxiliary optical component, the case comprising:
   a perimeter region configured to receive and generally surround a mobile electronic device to assist in protecting the mobile electronic device;
   a movable arm assembly comprising a movable arm, a first pivot point, and a second rotation point, the movable arm forming a portion of the perimeter region that is adjacent to an onboard camera of the mobile electronic device when the case is attached to the mobile electronic device, the arm being pivotable and rotatable around two different, non-parallel axes; and wherein the case comprises a standard stage in which the arm is positioned along and forms part of the perimeter region of a corner of the case and in which the arm is configured to cover a corner of the mobile electronic device, a transitory stage in which the arm is moved away from the perimeter region to create an opening in the perimeter region configured to receive an auxiliary optical component for use with the mobile electronic device, and a component-securing position configured to secure the auxiliary component, wherein a portion of the movable arm assembly is configured to contact the auxiliary optical component and secure the auxiliary optical component to the mobile electronic device when the case is attached to the mobile electronic device.

13. The combination of the protective case of claim 12 and the mobile electronic device.

14. The combination of the protective case of claim 12 and the auxiliary component.

15. The protective case of claim 12, wherein the case is a bumper case.

16. The protective case of claim 12, wherein the case comprises a rear face that extends across a rear portion of the mobile electronic device.

17. The protective case of claim 12, wherein the case is configured to retain the auxiliary optical component in a corner region of the case in the component securing position.

18. The protective case of claim 12, wherein the arm is positioned in a first corner region of the case in the standard stage.

19. The protective case of claim 18, wherein in the component-securing position the arm is positioned in a second corner region of the case that is different from the first corner region.

20. The protective case of claim 12, wherein the arm comprises two generally perpendicular portions.

21. The protective case of claim 1, wherein the auxiliary component is an optical component.

22. The protective case of claim 21, wherein the optical component is a lens.

* * * * *